United States Patent
Yoshida et al.

[19]

[11] Patent Number: 6,017,480
[45] Date of Patent: Jan. 25, 2000

[54] PROCESS FOR PRODUCING POLYOLEFIN MATERIALS

[75] Inventors: Sumio Yoshida; Osamu Otsu, both of Yokohama, Japan

[73] Assignee: Nippon Oil Co., Ltd., Tokyo, Japan

[21] Appl. No.: 08/823,031

[22] Filed: Mar. 21, 1997

[30] Foreign Application Priority Data

Mar. 22, 1996 [JP] Japan ..................... 8-093443

[51] Int. Cl.⁷ ............ B29C 43/00; B29C 43/22; B29C 43/26
[52] U.S. Cl. .............. 264/216; 264/230; 264/289.6; 264/342 RE; 264/DIG. 71; 264/210.7
[58] Field of Search ............ 264/289.6, 342 R, 264/342 RE, 230, 210.7, 290.2, 909, DIG. 71, 164, 216

[56] References Cited

U.S. PATENT DOCUMENTS

| | | | |
|---|---|---|---|
| 4,261,944 | 4/1981 | Hufnagel et al. | 264/210.7 |
| 5,458,841 | 10/1995 | Shirrell | 264/230 |
| 5,587,122 | 12/1996 | Lennard | 264/210.7 |
| 5,741,451 | 4/1998 | Dunbar et al. | 264/210.7 |

FOREIGN PATENT DOCUMENTS

| | | |
|---|---|---|
| 56-15408 | 2/1981 | Japan . |
| 59-100710 | 6/1984 | Japan . |
| 59-187614 | 10/1984 | Japan . |
| 60-15120 | 1/1985 | Japan . |
| 60-97836 | 5/1985 | Japan . |
| 63-41512 | 2/1988 | Japan . |
| 63-66207 | 3/1988 | Japan . |
| 2-258237 | 10/1990 | Japan . |
| 3-130116 | 6/1991 | Japan . |
| 7-156173 | 6/1995 | Japan . |
| 7-156174 | 6/1995 | Japan . |

OTHER PUBLICATIONS

Preprints of the Society of Polymer Science, Japan, vol. 34, No. 4, p. 873 (1985).

*Primary Examiner*—Jan H. Silbaugh
*Assistant Examiner*—Kenneth M. Jones
*Attorney, Agent, or Firm*—Akin, Gump, Strauss, Hauer & Feld, L.L.P.

[57] ABSTRACT

A process for producing polyolefin materials is disclosed which comprises the steps of (a) preparing a molded article of an ultra-high-molecular-weight polyolefin having a viscosity-average molecular weight of more than 500,000; (b) stretching said article by more than thirty-fold; (c) contracting the thus stretched article to an extent ranging from 0.3 to 80% in the direction of stretch; and (d) re-stretching the thus contracted article. The resulting polyolefin materials are improved in mechanical strength and elasticity modulus.

20 Claims, 1 Drawing Sheet

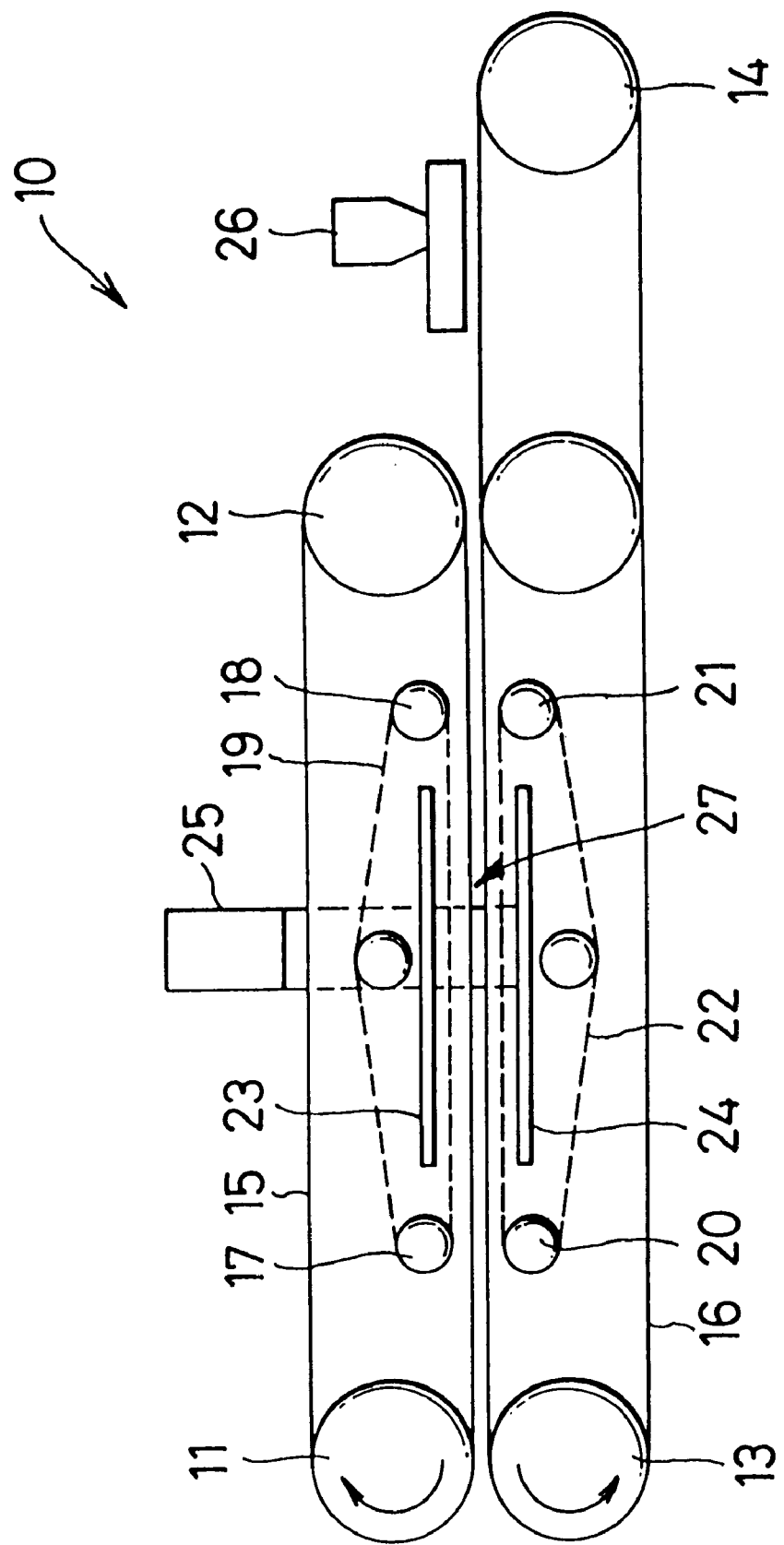

PROCESS FOR PRODUCING POLYOLEFIN MATERIALS

BACKGROUND OF THE INVENTION

1. Field of the Invention

This invention relates to a process for producing polyolefin materials of improved tensile strength and tensile modulus.

2. Prior Art

Polyolefins having molecular weights much higher than general-purpose polyolefins are known as ultra-high-molecular-weight polyolefins. Such polyolefins enjoy high credit as an engineering plastics for their superior resistance to impact and to abrasion and also for their peculiar self lubrication. These ultra-high-molecular-weight polyolefins are expected to be able to furnish molded products having high strength and high tensile modulus provided that they can be highly oriented. Therefore, there have been investigated a variety of methods of stretching ultra-high-molecular-weight polyolefins.

Paul Smith and Piet J. Lemstra et al. (Japanese Patent Laid-Open Publication No. 56-15408) proposed a process for stretching a certain gel derived from a decaline solution (dope) of an ultra-high-molecular-weight polyolefin at a high draw ratio. However, this dope can only be effected with limited polymer concentrations, say 3% by weight of a polyethylene having a weight-average molecular-weight of $1.5 \times 10^6$ and 1% by weight of a polyethylene having a molecular weight of $4 \times 10^6$. Such prior stretching methods are undesirable as dope preparation requires large amount of solvent and even meticulous care in dissolving the polymer in the solvent, entailing economical infeasibility and inconvenient handling.

It has been proposed to subject a dilute solution of an ultra-high-molecular-weight polyolefin in a solvent such as xylene, decaline and kerosene to isothermal crystallization by cooling thereby obtaining a mat accumulated with a single crystal for extrusion in solid state and stretching as disclosed for example in Japanese Patent Laid-Open Publication No. 59-187614, No. 60-15120 and No. 60-97836 and Preprints of the Society of Polymer Science, Japan, vol. 34, p. 873 (1985). This process is still uneconomical because of the large amount of solvent necessary for formation of single crystal mat.

It has also been proposed to stretch ultra-high-molecular-weight polyolefins without the use of solvents disclosed for example in Japanese Patent Laid-Open Publication No. 63-41512 and No. 63-66207 wherein a particulate ultra-high-molecular-weight polyolefin is subjected to compression molding at a temperature below its melting point and then to rolling and stretching, or as disclosed in Japanese Patent Laid-Open Publication No. 2-258237 wherein compression molding is effected continuously by means of a double belt pressure arrangement. The polyolefin products obtained by such stretching processes may be satisfactory in terms of mechanical strength and modulus, but is not quite acceptable in respect to elongation at break in some usages.

Japanese Patent Laid-Open Publication No. 59-100710 proposes to thermally contract the material after being stretched so as to provide enhanced toughness, but this process would lead to reduced strength and modulus of the resulting material.

It has now been found that there can be obtained a ultra-high-molecular-weight polyolefin material having a balanced proportion of tensile strength, tensile modulus and elongation at break by contracting the stretched molded article of the ultra-high-molecular-weight polyolefin under selected conditions and thereafter re-stretching the contracted article.

SUMMARY OF THE INVENTION

According to the invention, there is provided a process for producing polyolefin materials of high tensile strength and great elastic modulus, which comprises the steps of (a) preparing a molded article of an ultra-high-molecular-weight polyolefin having a viscosity-average molecular weight of more than 500,000; (b) stretching said molded article by more than thirty-fold; (c) contracting the thus stretched article to an extent ranging from 0.3 to 80% in the direction of stretch; and (d) re-stretching the thus contracted article.

BRIEF DESCRIPTION OF THE DRAWING

FIG. 1 is a schematic view of a suitable compression molding apparatus used for the inventive process.

DETAILED DESCRIPTION OF THE INVENTION

The molded article of ultra-high-molecular-weight polyolefin may be prepared in step (a) after or preferably without dissolution or gelation. The term "dissolution" used herein means an operation for dissolving an ultra-high-molecular-weight polyolefin into any suitable solvent.

Polyolefins used for the purpose of the invention are those having a viscosity-average molecular weight of more than 500,000, preferably 900,000 such as ultra-high-molecular-weight polyethylenes and ultra-high-molecular-weight polypropylenes.

Eligible ultra-high-molecular-weight polyethylenes have a viscosity-average molecular weight in the range of 500,000–12,000,000, preferably 900,000–9,000,000, more preferably 1,200,000–6,000,000. This molecular weight can be determined by an intrinsic viscosity at 135° C. in decaline in accordance with the equation $$[\eta] = 6.20 \times 10^{-4} \cdot M^{0.70} \qquad \mathrm{I}$$

wherein $[\eta]$ is an intrinsic viscosity and M is a viscosity-average molecular weight. The above range of viscosity-average molecular weights are equivalent to the intrinsic viscosity at 135° C. of 6–56 dl/g, preferably 9–46 dl/g, more preferably 11–34 dl/g.

Eligible ultra-high-molecular-weight polypropylenes have a viscosity-average molecular weight of more than 500,000, generally 500,000–12,000,000, preferably 900,000–9,000,000, more preferably 1,200,000–6,000,000. This molecular weight can be determined by an intrinsic viscosity at 135° C. in decaline in accordance with the equation $$[\eta] = 1.10 \times 10^{-4} \cdot M^{0.80} \qquad \mathrm{II}$$

wherein $[\eta]$ is an intrinsic viscosity and M is a viscosity-average molecular weight. The above ranges of viscosity-average molecular weights are equivalent to the intrinsic viscosity at 135° C. in decaline of 4–51 dl/g, preferably 6–40 dl/g, more preferably 8–29 dl/g.

Ultra-high-molecular-weight polypropylenes may have a molecular structure such as isotactic, syndiotactic and atactic depending on the reaction modes of polymerization, but any of these structures are eligible for the process of the invention. Isotactic is preferred for a polyolefin material having high mechanical strength and elastic modulus while sydiotactic and atactic are preferred for that having improved extension to break property.

Ultra-high-molecular-weight polyolefins of less than 500,000 in viscosity-average molecular weight would not be eligible for use in the invention. The use of molded article derived from such polyolefins in the inventive process would not result in a polyolefin material having sufficient mechanical strength for which the invention seeks.

No particular limitation is imposed upon the shape of these ultra-high-molecular-weight polyolefins, but granular or powdery polyolefins are preferred for the purpose of the invention. Preferably, the particle size of the granular polyolefins is less than 2,000 $\mu$m, preferably 1–2,000 $\mu$m, more preferably 10–1,000 $\mu$m. A narrow particle size distribution is preferred in terms of moldability.

Eligible ultra-high-molecular-weight polyolefin as a starting material for the inventive process may be derived by polymerizing an olefin monomer in the presence of a conventional catalyst comprising a compound containing a transition metal element in groups IV–VI of the Periodic Table. The catalyst may additionally contain an organometallic compound. For example, an ultra-high-molecular-weight polyethylene can be derived by homopolymerizing ethylene or copolymerizing the same with an $\alpha$-olefin. An ultra-high-molecular-weight polypropylene can be derived by homopolymerizing propylene or copolymerising the same with ethylene and/or $\alpha$-olefin (exclusive of propylene). Examples of $\alpha$-olefin include those having a carbon number of 3 to 12, preferably 3 to 6, such as propylene, butene-1, 4-methylpentene-1, hexane-1, octene-1, decene-1, dodecene-1 and the like.

Particularly preferred are propylene, butene-1, 4-methylpentene-1 and hexane-1. These ultra-high-molecular-weight polyethylenes or polypropylenes may if necessary contain a comonomer or comonomers including dienes such as butadiene, 1,4-hexadiene, vinylnorbornene, ethylidene-norbornene and the like.

In the case where the ultra-high-molecular-weight polyolefin is a copolymer of ethylene or propylene with an $\alpha$-olefin, the $\alpha$-olefin content in the final copolymer is in the range of 0.001 to 10% by mol, preferably 0.01 to 5% by mol, more preferably 0.1 to 1% by mol.

As mentioned above, the above catalyst may comprise a catalyst component containing a transitional metal compound such as titanium, vanadium, zirconium, hafnium and the like in combination with organometallic compounds as disclosed for instance in Japanese Patent Laid-Open Publication No. 3-130116 and in Japanese Patent Laid-Open Publication No. 7-156173. No particular restrictions are imposed upon the amount of the organometallic compound which however may conveniently be added in the range of 0.1 to 1,000 times per mol of the transition metal used.

Polymerization may be accomplished in a gaseous phase or a liquid phase both free from oxygen and water. Solvents for the liquid phase reaction are those inert to a selected catalyst including aliphatic hydrocarbons such as butane, iso-butane, pentane, hexane, octane, decane, dodecane and the like, alicyclic hydrocarbons such as cyclopentane, cyclohexane and the like, aromatic hydrocarbons such as benzene, toluene and the like and petroleum fractions. Monomers are also used as the solvent.

Polymerization temperatures are at from −20° to 350° C. and preferably 20° to 200° C. In order to prepare a molded article of ultra-high-molecular-weight polyolefin, the reaction temperature should be lower than the melting point thereof. Therefore, an ultra-high-molecular-weight polyethylene and an ultra-high-molecular-weight polypropylene may be polymerized at a temperature usually of the range between −20° C. and 110° C., preferably 0° C. and 90° C. and at a temperature usually of the range between −20° C.–150° C., preferably 0° C.–120° C. respectively.

Polymerization pressures are in the range of 0–70 kg/cm$^2$G, preferably 0–60 kg/cm$^2$G. The molecular weight of a polymer to be formed can be regulated by means of the temperature and pressure of polymerization, the nature and molar ratio of catalyst or the feed of hydrogen to the reaction system. According to the invention, polymerization may be done by a two or more-stage reaction under varied polymerization conditions.

In the step (a) of the inventive process, a particulate or powder ultra-high-molecular-weight polyolefin is formed into a sheet, film or tape like shape.

For the sake of convenience, the molded articles obtained in this step are referred to as un-stretched molded article hereinafter. Molding may be carried out by melting an ultra-high-molecular-weight polyethylene or dissolving the same into a suitable solvent or adding a suitable molding auxiliary but preferably by compression or extrusion in a solid phase.

In the case of solid phase compression, importantly, the starting ultra-high-molecular-weight polyolefin used for the purpose of the invention should be molded at a temperature below the melting point thereof.

Specifically, an ultra-high-molecular-weight polyethylene should be compressed at a temperature of at least 50° C., preferably 90° C., more preferably 110° C. but at a temperature below its melting point, preferably 145° C. An ultra-high-molecular-weight polypropylene should be compressed at a temperature of at least 90° C., preferably 130° C. but at a temperature below its melting point, preferably 175° C. Compression pressures may be usually below 1,000 kg/cm$^2$, preferably between 1–1,000 kg/cm$^2$.

An ultra-high-molecular-weight polyolefin may be prepared into a compression molded article preferably using a molding device having rotation means arranged in a vertically opposed relation. Eligible rotating means for the purpose of the invention includes rollers, endless belts and the like.

Referring to FIG. 1, there is shown an apparatus 10 suitable for the production of un-stretched molded article. The apparatus 10 comprises two pairs of rollers 11, 12; 13, 14, a pair of endless belts 15, 16 disposed taut in a vertically opposing relation by the rollers 11–14, endless roller conveyers 19, 22 which are disposed inside of the endless belts 15, 16 respectively and driven by a pair of sprockets 17, 18 and a pair of sprockets 20, 21 respectively, a pair of pressing platens 23, 24 disposed inside of the endless roller conveyers 19, 12 respectively. The pressing platens 23, 24 are vertically movable by means of hydraulic cylinder 25.

A starting polyolefin is fed from a hopper 26 onto the endless belt 16. The starting polyolefin on the endless belt 16 may be optionally preheated on the way to the point where the endless belt 15 is located and then nipped between the endless belts 15, 16, followed by travelling to a pressing section 27. In this section, the starting polyolefin is formed into a compression-molded sheet by the pressing platens 23, 24.

The pressing platens may be generally 30–400 cm, preferably 50–200 cm in length in the travelling direction of the endless belts 15, 16.

The average pressure applied by the pressing platens 23, 24 to the corresponding endless belts 15, 16 may be generally less than 200 kg/cm$^2$, usually 100 kg/cm$^2$, preferably 0.1–20 kg/cm$^2$, more preferably 0.1–20 kg/cm$^2$, most preferably 0.5–10 kg/cm$^2$.

The endless belts 5, 6 may run at a speed of 10–500 cm/min, preferably 50–200 cm/min dependent on the length of the pressing platens and the conditions of compression.

Although the primary role of the pressing platens is to press the material, they may be used as a heating means by arranging an electric heater or a flow passage for a heating medium.

There is another method of preparing an un-stretched article of ultra-high-molecular-weight polyolefin in which for instance the compression-molded sheet is obtained by rolling using more than two pairs of rollers as disclosed in Japanese Patent Laid-Open Publication No. 7-156173. Another eligible method for compression in a solid state is a ram extrusion method as disclosed in Japanese Patent Laid-Open Publication No. 7-156174.

The un-stretched molded article thus obtained in a solid state may be preferably subjected to rolling prior to be stretched in the step (b). Rolling may be carried out by any conventional methods in which for instance the un-stretched article is passed through more than two rollers each rotating in opposite directions or a plurality of calendering rollers. The number of the calendering rollers may be selectively in the range from 2 pairs to 15 pairs. The rollers may have a diameter of 5–200 cm and a length of 5–500 cm.

Rolling may be conducted at a temperature below the melting point of an ultra-high-molecular-weight polyolefin and preferably above 20° C. The un-stretched molded article of ultra-high-molecular-weight polyethylene should be rolled at least at 50° C., preferably 90° C., more preferably 110° C. but at a temperature below the melting point of the polyethylene, preferably 145° C. The un-stretched molded article of ultra-high-molecular-weight polypropylene should be rolled at least at 90° C., preferably 130° C. but at a temperature below the melting point of the polypropylene, preferably 170° C.

The deformation ratio of the un-stretched molded article may be generally over a wide range, but usually in the range of 1.2 to 20, preferably 1.5 to 10, as the length ratio after and before rolling. If the desired deformation ratio can not be achieved in a single step of rolling, the rolling can be repeated.

In the step (b) according to the invention, the un-stretched molded article which has been preferably rolled, is stretched, preferably by tensile drawing. The draw ratio is more than 30-fold in a direction of stretch. The term "draw ratio" as used herein refers to the ratio of the length of stretched molded article to the length of un-stretched molded article. If the un-stretched molded article is rolled prior to be stretched, the length thereof prior to be rolled is regarded as the length of un-stretched molded article. Therefore, a total draw ratio achieved by rolling of 1.5-fold and stretching of 20-fold is 30-fold (1.5×20=30).

Stretching is conducted by taking up the molded article using a take-up roller rotating faster than a feed roller feeding the un-stretched molded article. Stretching may be carried out by any conventional methods such as a method employing a feed roller and a take-up roller both of which are provided with nip rollers, Nelson method, a clover roller method employing a plurality of feed rollers and take-up rollers.

The molded article can be stretched with ease by heating it between a feed roller and a take-up roller. Heating may be conducted by way of fluid heating, plate heating, hot air heating, infrared heating, microwave heating and the like. If necessary, the feed roller and the take-up roller may have a heating medium arranged thereinside, but may be kept at room temperature.

Generally, an ultra-high-molecular-weight polyolefin tends to be raised in its melting point by orienting the molecular thereof. With the rise of melting point in view, the stretching temperature should be determined by the melting point of an ultra-high-molecular-weight polyolefin upon initiation of stretching, not by the melting point prior to be treated in the step (a). In the case of a molded article of ultra-high-molecular-weight polyethylene, the stretching temperature may be in the range of a lower threshhold of 20° C., preferably 90° C., more preferably a temperature which is 30° C. lower than the melting point of the polyethylene upon being stretched to an upper threshhold of generally 161° C., preferably 158° C., more preferably 155° C. Needless to mention, if the above upper threshhold temperature is higher than the melting point of the polyethylene to be stretched, the upper threshhold temperature is decreased to the melting point. In the case of a molded article of ultra-high-molecular-weight polypropylene, the stretching temperature may be in the range of 20°–175° C., preferably 20°–170° C., more preferably 100°–165° C., most preferably 130°–160° C. The stretching speed may be usually in the range from 0.1 to 500 m/min, preferably 1 to 200 m/min.

The draw ratio is desirously as high as possible because higher strength and higher modulus can be attained as the draw ratio becomes greater.

The draw ratio may be selected from the range of 30-fold to a fold immediately before the point at which the molded article is broken by stretching force, usually between 30-fold and 300-fold, preferably 80-fold and 200-fold, when the molded article of ultra-high-molecular-weight polyethylene is used. The molded article of polypropylene is stretched at a draw ratio ranging from more than 30-fold to less than a fold immediately before the point of occurence of the breakage of molded article due to the stretching force, usually in the range of 35-fold to 120-fold, preferably 50-fold to 100-fold.

If the un-stretched molded article can not be stretched in a desired draw ratio in a single step, the stretching can be conducted in multi-step. When the stretching is conducted in multi-step, it is preferred to increase progressively the stretching temperature toward the last step.

In the case of the molded article of ultra-high-molecular-weight polyethylene, the stretching temperature of the first step may be in the range of 80°–140° C., while the molded article of ultra-high-molecular-weight polypropylene may be stretched at a temperature of 100°–150° C. The number of steps in the multi-step is 2–200 steps, preferably 3–100 steps, more preferably 5–50 steps. The multi-step stretching may be conducted by employing a batch method in which the molded article to be stretched is fed by a feed roller and taken up by a take-up roller in each steps or a continuous method in which the stretching is continuously repeated between a plurality of feed rollers and take up rollers which are arranged in line.

In the step (c) according to the invention, the stretched molded article thus obtained is thermally contracted to an extent of 0.3–80%. The contracted with respect to the direction of stretching is preferably in the range of 0.5–50%. The contracted less than 0.3% would not give so much change in the inner structure of the molded article, leading to failure of the production of polyolefin material intended by the present invention even though the contracted molded articles were re-stretched in the step (c). The contraction of more than 80% would result in the inner structure of the molded article which is not feasible for re-stretching.

The stretched molded article is contracted by heating up at least to a lower limit temperature which is 50° C. lower than the melting point of the polyolefin. Specifically, the stretched molded article of ultra-high-molecular-weight polyethylene may be heated to at least 120° C., preferably 130° C., more preferably 140° C., while the stretched molded article of ultra-high-molecular-weight polypropylene may be heated to a temperature of at least 140° C., preferably 150° C., more preferably 155° C. In each case, the upper limit is a temperature below the melting point of the polyolefins to be contracted.

Heating may be conducted by any conventional means such as liquid heating, hot-air heating, infrared heating, microwave heating and the like. If necessary, contraction may be repeatedly conducted on the same stretched molded article.

In the step (d) according to the invention, the contracted molded article thus obtained is re-stretched to obtain a final product of polyolefin material which is well balanced in tensile strength, tensile modulus and elongation at break.

The re-stretching is conducted at a temperature at which the contracted molded article is not substantially melted. The same stretching procedure in the step (a) may be applied in this step. In the case of the contracted molded article of ultra-high-molecular-weight polyethylene, the re-stretching temperature may be usually at least 20° C., preferably 90° C., more preferably a temperature which is 30° C. lower than the melting point of the polyethylene and not more than 161° C., preferably 158° C., more preferably 155° C. Needless to mention, if the above upper limit temperature upon re-stetching is higher than the melting point of the contracted molded article of ultra-high-molecular-weight polyethylene prior to be re-stretched, the melting point of the polyethylene to be re-stretched is regarded as the upper limit temperature for re-stretching. In the case of the contracted molded article of ultra-high-molecular-weight polypropylene, the re-stretching may be performed at usually 20–175° C., preferably 20–170° C., more preferably 100–165° C., most preferably 130–160° C.

The re-stretching may be conducted in a single- or multi-step. When the multi-step stretching is conducted, the re-stretching temperature is preferably increased as the contracted molded article progresses to the succeeding steps. The re-stretching temperature in the first step for the contracted molded article of ultra-high-molecular-weight polyethylene may be in the range of 80–140° C., while that for the contracted molded article of ultra-high-molecular-weight polypropylene may be in the range of 100–150° C.

The re-stretching speed may be in the range of usually 0.1–500 m/min, preferably 1–200 m/min.

The draw ratio varies dependent on the required tensile strength, tensile modulus and extension to break for the resulting polyolefin material. In the case of producing polyolefine materials primary improved in tensile strength at break, it is desired to re-stretch the contracted molded article at a draw ratio less than 95% of the draw ratio of the un-contracted stretched molded artilce. In the case of intending to produce polyolefin materials improved in the above-mentioned physical properties, it is preferred to re-stretch the contracted molded article at a higher draw ratio than that of the un-contracted stretched molded article, to an extent that an extension to break does not occur. More specifically, the draw ratio of the re-stretched molded article (this ratio is defined as "the draw ratio of the stretched article" ×"contraction ratio" ×"the draw ratio for re-stretching") with respect to the draw ratio of the stretched article prior to be contracted falls within the range of 1.1–10 fold, preferably 1.5–5 fold.

The re-stretching may be also conducted in a single-or multi-step.

The foregoing described the steps in which the molded article of ultra-high-molecular-weight polyolefin is stretched, contracted and re-stretched, but the invention does not exclude the possibility of repeating those steps.

According to the process of the invention comprising the steps (a) through (c), it is possible to obtain polyethylene materials having a tensile modulus in excess of 1,600 g/D, a tensile strength in excess of 25 g/D and a tensile elongation at break of in excess of 5 percent and polypropylene materials having a tensile modulus in excess of 240 g/D, a tensile strength in excess of 12 g/D and a tensile elongation at break in excess of 10 percent.

Thanks to the well balanced physical properties of high tensile strength, high tensile modulus and high elongation at break of the polyolefin material produced by the inventive process, yarn made of the invented polyolefin material shows excellent characteristics. Such yarn exemplarily includes multifilament yarn, monofilament yarn, flat yarn such as tape-shaped yarn, and split yarn.

If necessary, the materials obtained by the inventive process may be subjected to treatments such as corona discharge treatment, plasma treatment, chemical oxidation treatment and flame treatment.

The present invention will now be described by way of the following examples which should be regarded as illustrative.

Preparation of Stretched Molded Article (1) Compression molding

Specification of apparatus used:

1. Rollers: Diameter-500 mm, Face length-300 mm
2. Steel belts: Thickness-0.6 mm, Width-200 mm
3. Small diameter rollers: Diameter-12 mm, Face length-250 mm
4. Platens: Length-1,000 mm, Width-200 mm
5. Hydraulic cylinder: Diameter 125 mm Using the compression molding apparatus of the above specification, a powder of ultra-high-molecular-weight polyethylene or polypropylene was nipped between the pair of steel belts, pressurized at an average of 6 kg/cm$^2$ (the pressure was transmitted to the powder via the hydraulic cylinders, the platens, small-diametyer rollers and the steel belt in this order) and continuously compression-molded at a speed of 1 m/min thereby obtaining a sheet of 1 mm in thickness and 100 mm in width.

The molding temperature for the ultra-high-molecular-weight polyethylene and polypropylene were 130° C. and 160° C. respectively.

(2) Rolling

Specification of apparatus used:

Roller shape: Diameter-150 mm$\phi$, Face length-300 mm

Roller numbers: one pair

Roller spacing: 40 $\mu$m

The resultant molded article was horizontally fed into the space between the pair of rollers rotating at a peripheral line speed of 7 m/min thereby to obtain a sheet rolled at a deformation ratio of 7-fold. The temperatures of rollers were 140° C. and 170° C. for the ultra-high-molecular-weight polyethylene and polypropylene respectively.

(3) Stretching

Specification of apparatus used:

Metallic rollers for preheating: 3 sets of 3 rollers,
  Roller Diameter-250 mm$\phi$,
  Face length-200 mm Hot plate for stretching: Length-200 cm Metallic rollers for cooling: a set of 3 rollers,
  Roller Diameter-250 mmφ,
  Face length-200 mm
Niproll: inlet side-silicon rubber of 200 mmφrollers
  nipping the two preheating rollers,
  outlet side-slicon rubber rollers of 200 mmφ
  nipping the two cooling rollers.

The rolled sheet obtained in above (2) was cut into a tape of 5 mm in width using a slitter. The tape was stretched by tensile drawing.

Preparation of Stretched Molded Article

Stretched Molded Articles 1 Through 4

A powder of high-molecular-weight polyethylene which has a viscosity-average molecular weight of 2.5 millions and the melting point of 141° C. and had been polymerized by the slurry system at 80° C. was compression-molded, rolled and slitted into a sheet of 5 mm in width, followed by stretching using the above apparatus under the above conditions. The stretching was conducted 1 to 3 times dependent on the draw ratio to be intended. The temperatures of the first, second and third stretching were 145° C., 148° C. and 151° C. respectively. The resulting stretched molded articles had the following physical properties.

| Stretched molded article | draw ratio (folds) | stretching (number of times) | tensile modulus (g/D) | tensile strength (g/D) | elongation at break (%) |
|---|---|---|---|---|---|
| 1 | 30 | 1 | 840 | 10.1 | 4.8 |
| 2 | 59 | 2 | 1,320 | 17.5 | 3.8 |
| 3 | 93 | 3 | 1,570 | 22.5 | 3.2 |
| 4 | 122 | 3 | 1,760 | 25.1 | 2.8 |

Stretched Molded Article 5

A powder of ultra-high-molecular-weight polypropylene (isotactic) which has a viscosity-average molecular weight of 1.5 millions and the melting point of 174° C. and had been polymerized by the slurry system at 90° C. was compression-molded and rolled into a sheet. The resulting sheet was slitted into a width of about 5 mm and stretched by tensile drawing. The stretching was conducted 1 to 3 times. The temperatures of each of the stretching were 165° C., 166° C. and 169° C. respectively. The resultant stretched molded article had the following physical properties.

| Stretched molded article | draw ratio (folds) | stretching (number of times) | tensile modulus (g/D) | tensile strength (g/D) | elongation at break (%) |
|---|---|---|---|---|---|
| 5 | 63 | 3 | 180 | 9.6 | 8.3 |

INVENTIVE EXAMPLES 1 THROUGH 16

Thermal contraction was conducted using the stretched molded articles 1 to 4.The thermal contraction was carried out using a hot plate of 200 cm in length having feed rollers at one end and take-up rollers at the other. The contraction of the articles was brought about on the hot plate while the stretched molded article was fed from the feed roller rotating at a peripheral line speed of 20 m/min and taken up by the take-up roller rotating at a lower peripheral line speed, lower in a rate corresponding to the desired contraction ratio. The temperature of the hot plate was maintained at 149° C. which is lower than the melting point of the material prior to be contracted.

The resulting contracted samples were re-stretched by tensile drawing using the same apparatus used for the preparation of the stretched molded article. The number of times for the re-stretching was varied from 1 to 4 times depending on the draw ratio to be intended. The re-stretching temperatures were those at which the shrunken samples do not melt. The re-stretching in the first step to the fourth step was carried out at temperatures of 145° C., 148° C., 151° C. and 151° C. respectively. The resulting stretched articles had the physical properties shown in Table 1.

INVENTIVE EXAMPLES 17 THROUGH 20

Thermal contraction was conducted using the stretched molded article 5. The thermal contraction was carried out using a hot plate of 200 cm in length having feed rollers at one end and take-up rollers at the other. The contraction of the articles was brought about on the hot plate while the stretched molded article was fed from the feed rollers rotating at a peripheral line speed of 20 m/min and taken up by the take-up rollers rotating at a lower peripheral line speed lower in a rate corresponding to the desired contraction ratio. The temperature of the hot plate was maintained at 170° C. which is lower than the melting point of the material prior to be contracted.

The resulting contracted samples were re-stretched by tensile drawing using the apparatus used for the preparation of the stretched molded article.

The number of times for the re-stretching was varied from once to 4 times depending on the draw ratio to be intended. The re-stretching temperatures were those at which the contracted samples do not melt. The re-stretching from the first step to the fourth step was carried out at temperatures of 165° C., 166° C., 169° C. and 172° C. respectively. The resulting stretched articles had the physical properties shown in Table 1.

TABLE 1

| Inventive Example | Stretched molded article | after contraction | | | | re-stretching | | | | |
|---|---|---|---|---|---|---|---|---|---|---|
| | | contraction *1 (%) | tensile modulus (g/D) | tensile strength (g/D) | elongation at break (%) | draw ratio *2 (folds) | stretching (number of times) | tensile modulus (g/D) | tensile strength (g/D) | elongation at break (%) |
| 1 | 3 | 50 | 460 | 16.2 | 12.1 | 51 | 1 | 990 | 16.9 | 9.3 |
| 2 | 3 | 50 | 460 | 16.2 | 12.1 | 69 | 2 | 1,150 | 19.2 | 8.4 |
| 3 | 3 | 50 | 460 | 16.2 | 12.1 | 94 | 3 | 1,370 | 21.6 | 7.8 |
| 4 | 4 | 50 | 650 | 18.4 | 10.9 | 72 | 1 | 1,180 | 19.4 | 8.2 |
| 5 | 4 | 50 | 650 | 18.4 | 10.9 | 88 | 2 | 1,310 | 21.5 | 7.4 |
| 6 | 4 | 50 | 650 | 18.4 | 10.9 | 109 | 3 | 1,450 | 22.7 | 6.2 |

TABLE 1-continued

| | | after contraction | | | | re-stretching | | | |
|---|---|---|---|---|---|---|---|---|---|
| Inventive Example | Stretched molded article | contraction *1 (%) | tensile modulus (g/D) | tensile strength (g/D) | elongation at break (%) | draw ratio *2 (folds) | stretching (number of times) | tensile modulus (g/D) | tensile strength (g/D) | elongation at break (%) |
| 7 | 1 | 10 | 360 | 7.7 | 12.3 | 122 | 4 | 1,510 | 24.2 | 5.4 |
| 8 | 2 | 10 | 490 | 15.9 | 10.6 | 118 | 3 | 1,520 | 24.7 | 5.5 |
| 9 | 3 | 10 | 710 | 19.8 | 8.6 | 127 | 2 | 1,540 | 24.9 | 5.4 |
| 10 | 4 | 10 | 910 | 22.1 | 7.8 | 135 | 1 | 1,780 | 25.1 | 5.6 |
| 11 | 3 | 50 | 460 | 16.2 | 12.1 | 101 | 3 | 1,480 | 23.2 | 6.5 |
| 12 | 3 | 50 | 460 | 16.2 | 12.1 | 115 | 3 | 1,550 | 24.0 | 6.0 |
| 13 | 3 | 50 | 460 | 16.2 | 12.1 | 131 | 4 | 1,670 | 24.6 | 5.5 |
| 14 | 4 | 50 | 650 | 18.4 | 10.9 | 126 | 3 | 1,610 | 25.0 | 5.8 |
| 15 | 4 | 50 | 650 | 18.4 | 10.9 | 139 | 3 | 1,640 | 25.3 | 5.5 |
| 16 | 4 | 50 | 650 | 18.4 | 10.9 | 143 | 4 | 1,650 | 25.3 | 5.3 |
| 17 | 5 | 50 | 96 | 4.5 | 18.9 | 35 | 1 | 103 | 6.9 | 16.3 |
| 18 | 5 | 50 | 96 | 4.5 | 18.9 | 50 | 2 | 150 | 8.2 | 14.3 |
| 19 | 5 | 50 | 96 | 4.5 | 18.9 | 72 | 3 | 225 | 10.7 | 12.7 |
| 20 | 5 | 50 | 96 | 4.5 | 18.9 | 86 | 4 | 248 | 12.6 | 11.6 |

*1 contraction: contraction in the stretching direction
*2 draw ratio: (draw ratio prior to be contracted) × (contraction ratio) × (draw ratio of re-stretching)

What is claimed is:

1. A process for the production of polyolefinic materials which comprises the steps of (a) preparing a molded article of an ultra-high-molecular-weight polyolefin having a viscosity-average molecular weight of more than 500,000; (b) stretching said molded article by more than thirty-fold in a direction of stretch; (c) shrinking the thus stretched article to an extent ranging from 0.3 to 80% in the direction of stretch; and (d) re-stretching the thus shrunken article.

2. The process according to claim 1 wherein said molded article in said step (a) is prepared without melting said ultra-high-molecular-weight polyolefin and/or dissolving the same in a solvent.

3. The process according to claim 1 wherein step (a) is performed using said ultra-high-molecular-weight polyolefin in a granular or powder form having a particle size not greater than 2,000 µm.

4. The process according to claim 1 further comprising the step of polymerizing an olefin monomer in the presence of a catalyst which comprises a compound containing transitional metal elements in groups IV to VI of the periodic table to form said ultra-high-molecular-weight polyolefin used in step (a).

5. The process according to claim 1 wherein said ultra-high-molecular-weight polyolefin is one selected from the group consisting of an ultra-high-molecular-weight polyethylene and an ultra-high-molecular-weight polypropylene.

6. The process according to claim 1 wherein said molded article in said step (a) is prepared by compression-molding.

7. The process according to claim 1 wherein said molded article in said step (a) is prepared by compression-molding, followed by rolling.

8. The process according to claim 6 wherein said compression-molding is conducted at a temperature below the melting point of said ultra-high-molecular-weight polyolefin.

9. The process according to claim 7 wherein said rolling is conducted at a temperature of higher than 20° C.

10. The process according to claim 7 wherein said molded article has a deformation ratio in the range of 1.2 to 20 in terms of a length ratio after and before rolling.

11. The process according to claim 1 wherein the stretching in said step (b) is conducted at a temperature below the melting point of the ultra-high-molecular-weight polyolefin to be stretched.

12. The process according to claim 1 wherein the stretching in said step (b) is effected at a temperature of higher than 20° C.

13. The process according to claim 1 wherein said stretching in said step (b) is conducted at a speed in the range of 0.1 to 500 m/min.

14. The process according to claim 1 wherein the contracting in said step (c) is conducted by heating said stretched article.

15. The process according to claim 1 wherein the contraction in said step (c) is effected at a temperature below the melting point of the ultra-high-molecular-weight polyolefin to be contracted.

16. The process according to claim 1 wherein the contraction in said step (c) is effected at least at a temperature of 50° C. lower than the melting point of the ultra-high-molecular-weight polyolefin to be contracted.

17. The process according to claim 1 wherein the re-stretching in said step (d) is conducted at a temperature below the melting point of the ultra-high-molecular-weight polyolefin to be re-stretched.

18. The process according to claim 1 wherein the re-stretching in said step (d) is conducted at a temperature of higher than 20° C.

19. The process according to claim 1 wherein the re-stretching is conducted at a speed in the range of 0.1 to 500 m/min.

20. The process according to claim 7 wherein said compression-molding is conducted at a temperature below the melting point of said ultra-high-molecular-weight polyolefin.

* * * * *